United States Patent
Sepulveda-Alancastro et al.

(10) Patent No.: US 10,216,015 B2
(45) Date of Patent: Feb. 26, 2019

(54) VARIABLE OPTICAL ATTENUATOR WITH INTEGRATED CONTROL BASED ON STRONGLY CORRELATED MATERIALS

(71) Applicant: Board of Trustees of Michigan State University, East Landing, MI (US)

(72) Inventors: Nelson Sepulveda-Alancastro, Haslett, MI (US); Noraica Davila-Melendez, Redwood City, CA (US); Emmanuelle J. Merced-Grafals, Redwood City, CA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 212 days.

(21) Appl. No.: 15/123,151

(22) PCT Filed: Mar. 12, 2015

(86) PCT No.: PCT/US2015/020128
§ 371 (c)(1),
(2) Date: Sep. 1, 2016

(87) PCT Pub. No.: WO2015/138694
PCT Pub. Date: Sep. 17, 2015

(65) Prior Publication Data
US 2017/0168325 A1  Jun. 15, 2017

Related U.S. Application Data

(60) Provisional application No. 61/952,957, filed on Mar. 14, 2014.

(51) Int. Cl.
*G02F 1/01* (2006.01)
*G02F 1/19* (2006.01)
*E06B 9/24* (2006.01)

(52) U.S. Cl.
CPC .............. *G02F 1/0147* (2013.01); *E06B 9/24* (2013.01); *G02F 1/0121* (2013.01); *G02F 1/19* (2013.01);
(Continued)

(58) Field of Classification Search
CPC .. G02F 1/0147; G02F 1/0121; G02F 2203/11; G02F 2203/48; E06B 9/24; E06B 2009/2464
See application file for complete search history.

(56) References Cited

U.S. PATENT DOCUMENTS 8,115,991 B2 * 2/2012 Wild .................. C09K 9/00
359/360

OTHER PUBLICATIONS

Aurelian, C. et al., "Exploiting the semiconductor-metal phase transition of V02 materials: a novel direction towards tuneable devices and systems for RF-microwave application", Mar. 1, 2010, Moumita Mukherjee (Ed.), http://cdn.intechopen.com/pdfs-wm/9985.pdf>; p. 45, paragraphs 2, 4; p. 46, figure 9; p. 47, paragraph 1, figure 10.*

(Continued)

*Primary Examiner* — Joseph P Martinez
(74) *Attorney, Agent, or Firm* — Harness, Dickey & Pierce, PLC (57) ABSTRACT

An optical attenuator (104) includes a substrate (116), an attenuation layer (120), and a pair of electrodes (124). The substrate (116) is transparent with respect to a range of light wavelengths. The attenuation layer (120) is formed on the substrate (116) and includes a strongly-correlated material. An optical transmissivity of the strongly-correlated material is strongly correlated with a resistance of the strongly-correlated material, and the optical transmissivity as applied to the light wavelengths is variable. The pair of electrodes (124) is at least one of formed on and embedded within the (Continued)

attenuation layer (120). The pair of electrodes (124) is configured to provide an indication of the resistance of the attenuation layer (120).

20 Claims, 8 Drawing Sheets

(52) U.S. Cl.
CPC ... *E06B 2009/2464* (2013.01); *G02F 2203/11* (2013.01); *G02F 2203/48* (2013.01)

(56) References Cited

OTHER PUBLICATIONS

Cabrera, R et al., "A micro-electro-mechanical memory based on the structural phase 11, 1,5 transition of V02", Aug. 30, 2013, Phys. Status Solidi A, http://www.egr.msu.edu/~nelsons/Papers/Cabrera%20et%20al%20pssa%202013.pdf>; p. 1, paragraph 2; p. 3, paragraph 5; p. 4, paragraph 3.*

Aurelian, C. et al., "Exploiting the semiconductor-metal phase transition of VO2 materials: a novel direction towards tuneable devices and systems for RF-microwave application", Mar. 1, 2010, Advanced Microwave and Millimeter Wave Technologies Semiconductor Devices Circuits and Systems, Moumita Mukherjee (Ed.), ISBN: 978-953-307-031-5, In Tech, [online], [retrieved on May 21, 2015]. Retrieved from the Internet: <URL: http://cdn.intechopen.com/pdfs-wm/9985.pdf>; p. 45, paragraphs 2, 4; p. 46, figure 9; p. 47, paragraph 1, figure 10.

Cabrera, R. et al., "A micro-electro-mechanical memory based on the structural phase transition of VO2", Aug. 30, 2013, Phys. Status Solidi A, 1-8 (2013)/DOI 10.1002/pssa.201330021, [online], [retrieved on May 21, 2015]. Retrieved from the Internet: <URL: http://www.egr.msu.edu/~nelsons/Papers/Cabrera%20et%20al%20pssa%202013.pdf>; p. 1, paragraph 2; p. 3, paragraph 5; p. 4, paragraph 3.

\* cited by examiner

VARIABLE OPTICAL ATTENUATOR WITH INTEGRATED CONTROL BASED ON STRONGLY CORRELATED MATERIALS

CROSS-REFERENCE TO RELATED APPLICATIONS

This application is a U.S. National Phase Application under 35 U.S.C 371 of International Application No. PCT/US2015/020128 filed on Mar. 12, 2015. This application also claims the benefit of priority of U.S. Provisional Application No. 61/952,957, filed on Mar. 14, 2014. The disclosures of all of the above applications are incorporated herein by reference.

GOVERNMENT RIGHTS

This invention was made with government support under ECCS1306311, ECCS1139773, and DGE0802267 awarded by the National Science Foundation. The government has certain rights in the invention.

FIELD

The present disclosure relates to variable optical attenuators, and more particularly to variable optical attenuators using strongly correlated materials to vary the attenuation of an optical signal.

BACKGROUND

Optical network systems typically implement various optical attenuators to achieve accurate optical attenuation. Example optical attenuators include, but are not limited to, mechanical shutters, micro-electro-mechanical systems, and electro-optic ceramics.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An optical attenuator is provided with integrated control based on strongly correlated materials. The optical attenuator includes a substrate, an attenuation layer, and a pair of electrodes. The substrate is transparent with respect to a range of light wavelengths. The attenuation layer is formed on the substrate and includes a strongly-correlated material. An optical transmissivity of the strongly-correlated material is strongly correlated with a resistance of the strongly-correlated material, and the optical transmissivity as applied to the light wavelengths is variable. The pair of electrodes is at least one of formed on and embedded within the attenuation layer. The pair of electrodes is configured to provide an indication of the resistance of the attenuation layer.

The optical attenuator may further include a heating element at least one of formed on and embedded within the attenuation layer, where the heating element adjusts a temperature of the attenuation layer. The heating element may also receive a current and adjusts the temperature of the attenuation layer based on the current.

In some embodiments, the strongly-correlated material corresponds to vanadium dioxide.

In other embodiments, the substrate includes a window and the attenuation layer is formed on a region of the substrate corresponding to the window. A thickness of the region of the substrate corresponding to the window may be less than a thickness of other regions of the substrate.

An optical attenuation system is also provided. The optical attenuation system includes an optical attenuator and an optical attenuation control module. The optical attenuator includes a strongly-correlated material. An optical transmissivity of the strongly-correlated material is strongly correlated with a resistance of the strongly-correlated material, and the optical transmissivity is variable. The optical attenuation control module measures the resistance of the optical attenuator and determines the optical transmissivity of the optical attenuator based on the resistance of the optical attenuator.

In some embodiments, the optical attenuation control module adjusts, based on the resistance, a temperature of the optical attenuator to adjust the optical transmissivity of the optical attenuator.

In other embodiments, the optical attenuation control module provides a current to a heating element to adjust the temperature of the optical attenuator, wherein the heating element is at least one of formed on and embedded within the optical attenuator.

In yet other embodiments, the optical attenuation control module implements a proportional-integral controller to adjust the temperature of the optical attenuator based on the resistance of the optical attenuator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Vanadium dioxide (VO2) has received a lot of attention by researchers from diverse fields due to the material's phase transition, during which many properties change abruptly. The combination of this multifunctionality with the relatively low transition temperature (~68° C.) has inspired the use of this material in many specific devices, including temperature and optical sensors and micro-electro-mechanical systems (MEMS) actuators. Two of the material's properties that show an abrupt change across the phase transition are the optical transmissivity (particularly for wavelengths in the range of ~900 nm to - - - 2500 nm) and the electrical resistance. Recent studies suggest that the change in these two properties come as the result of the first-order insulator-to-metal-transition (IMT) in VO2, which is not driven by the structural phase transition (SPT). Although the change of individual properties shows hysteresis, the correlated nature of the optical and electrical properties changes across the phase change in VO2 can be combined to significantly reduce the hysteresis. This strong correlation between the optical and electrical properties in VO2 during the material's IMT allows for the implementation of a self-sensing mechanism that enables the development of devices where the optical properties can be controlled by sensing the film's resistance. This disclosure reports a VO2-based variable optical attenuator (VOA) in the near-IR (NIR) region, which is completely controlled by sensing the film's resistance. The functionality of the device is demonstrated by the variable attenuation of the optical power output of an NIR laser beam in free space. The fabrication of the device is very simple and the implementation of the control system does not require complex hysteresis compensation or inversion algorithms.

Optical attenuators, in visible and NIR wavelengths, are widely used in optics, photonics and optical networks. The most commonly known attenuators are used in free space, while more complex designs are combined with optical fibers in photonics and communication networks. They are commercially available for a single optical density (OD), meaning a single attenuation level. For multiple attenuation values, a step variable or continuous variable attenuator with manual control is used. Mechanical systems with motorized stages are compatible with free space VOA to facilitate the switching among the attenuation levels, but noise could be introduced with the mechanical movement. Such devices have limited OD ranges and are not offered with fully-electronic control.

In the last decade, electronically controlled VOAs have been developed to assist communication networks demands. Devices with fast time response (~30 μs) and dynamic range of 25 dB are commercially available. These devices are based on optoceramic materials (PMN-PT and PLZT). MEMS-based VOAs that are compatible with optical fibers and electronically controlled have also been reported. Some of them use micromirrors and reflective materials, others are based on microfluidics, and others are assisted with piezoelectric materials. Plasmonic-based VOAs have also been investigated using waveguides. More recently, an electronically controlled VOA based on multilayered graphene operating at 785 nm was reported.

An optical attenuator according to the principles of the present disclosure provides the capability of electronic tunability for NIR applications in free space. A fully electronic, solid-state variable optical attenuator in the near-infrared region is reported. The observed attenuation varied from 0 dB to 19.24 dB. The device is enabled by the strong correlation between the electrical and optical properties in vanadium dioxide thin films across its phase transition. A self-sensing feedback approach is used to significantly reduce the inherently hysteretic behavior of the film. The reduction of the hysteresis, sensing the electrical property with respect to the optical property, allowed for a relatively simple approach for the modeling and control of the system. The device covers a wide attenuation range of almost two orders of magnitude with response times tens of microseconds while maintaining a power consumption of tens of milliwatts. The device is suited to operate in both free space and optical fiber systems.

Example embodiments will now be described more fully with reference to the accompanying drawings.

Figure 1A:
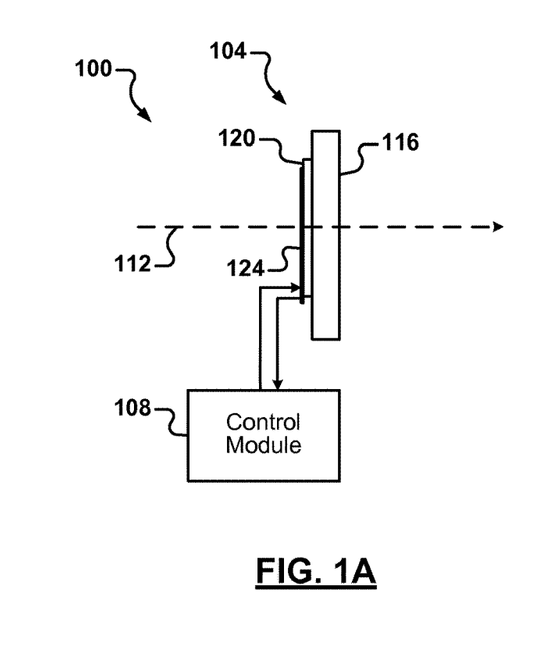
FIGS. 1A and 1B are example optical attenuation systems according to the principles of the present disclosure.

Referring now to FIG. 1A, an example optical attenuation system 100 according to the principles of the present disclosure includes an optical attenuator 104 and an optical attenuation control module 108. The optical attenuator 104 attenuates an optical signal 112 transmitted through the optical attenuator 104. The optical attenuator 104 includes a substrate 116 that is transparent to a desired range of light wavelengths. For example, the substrate 116 is transparent to a range of light wavelengths corresponding to possible wavelengths of the optical signal 112.

An attenuation layer 120 is formed on the substrate 116. The attenuation layer 120 is formed of, for example only, vanadium dioxide (VO2) or another strongly-correlated material. Other example strongly-correlated materials include, but are not limited to, vanadium sesquioxide (V2O3). For example only, the attenuation layer 120 corresponds to a thin film. As used in the present disclosure, the term "strongly-correlated" corresponds to a material having a strong correlation between an optical attenuation (or, transmissivity) of the material and one or more electrical characteristics of the material. In other words, as the optical attenuation of the material changes, an electrical characteristic of the material changes in a closely proportional amount as the optical attenuation. For example, in VO2, the optical attenuation and resistance of the VO2 are strongly correlated. Accordingly, as the optical attenuation of the VO2 changes, a corresponding change in the resistance of the VO2 is predictable.

Conversely, a change in the resistance of the VO2 corresponds to a predictable change in the optical attenuation of the VO2. As the resistance changes, the optical attenuation can be accurately determined. To measure the resistance, the optical attenuator 104 includes a pair of electrodes 124. For example, the electrodes 124 may be formed on or embedded within the attenuation layer 120, or formed between the attenuation layer and the substrate 116. For example only, the electrodes 124 comprise platinum. However, any other suitable material may be used to form the electrodes 124.

The optical attenuation of the attenuation layer 120 can be adjusted by, for example, changing a temperature of the attenuation layer 120. For example, optical attenuation and resistance of VO2 vary with temperature in a strongly-correlated fashion as described in the present disclosure. Specifically, as the temperature increases, the resistance decreases and the optical transmission percentage decreases. Conversely, as the temperature decreases, the resistance increases and the optical transmission percentage increases. Accordingly, the temperature of the attenuation layer 120 can be controlled to achieve a desired attenuation/transmission percentage of the optical attenuator 104.

The temperature of the attenuation layer 120 can be controlled using, for example only, one or more heating elements, such as an electrode loop (not shown in FIG. 1A), formed on or embedded within the attenuation layer 120. For example, the electrode loop may comprise the same material as the electrodes 124, and/or may be formed in a same manufacturing step as the electrodes 124.

The control module 108 controls a current through the electrode loop to adjust the temperature of the attenuation layer 120. For example, the control module 108 may modulate the amount of current based on a desired transmission percentage of the attenuation layer 120. The control module 108 also measures the resistance of the attenuation layer 120 (e.g., by providing a voltage across the electrodes 124 to sense the resistance) as the temperature of the attenuation layer 120 increases and decreases. Accordingly, the control module 108 may determine the transmission percentage of the attenuation layer 120 based on the measured resistance.

Various structures and methods may be used to control the temperature of the attenuation layer 120 based on the measured resistance to achieve a desired optical transmission percentage. For example, the control module 108 may implement a proportional-integral (PI) or other controller to adjust the transmission percentage according to a difference between a desired transmission percentage and a transmission percentage calculated using the measured resistance. The control module 108 may implement a model, lookup table, analog circuit, logic circuit, microcontroller, or any other suitable structure for calculating and controlling the transmission percentage using the measured resistance.

Figure 1B:
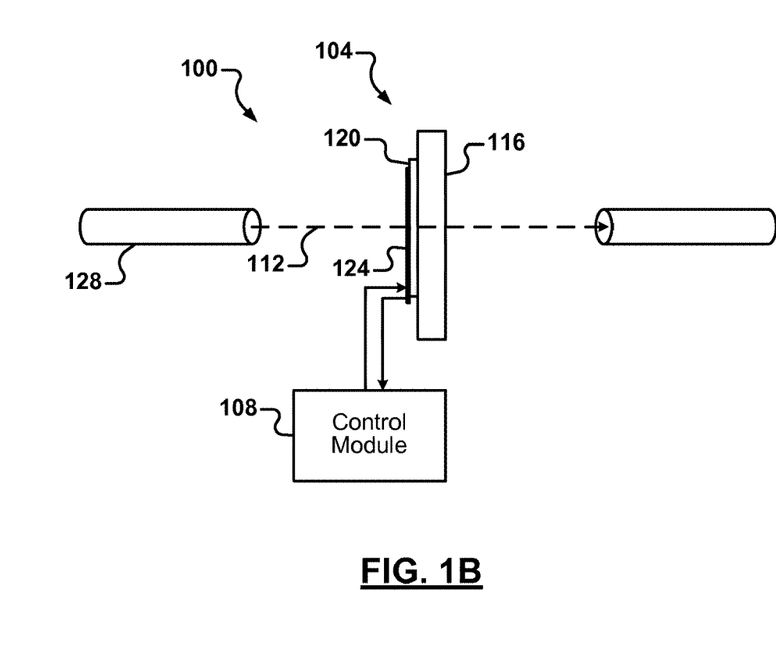

Although shown being transmitted through free space, the principles of the present disclosure may also be applied to an optical signal 112 transmitted via an optical fiber 128 as shown in FIG. 1B.

Figure 2A:
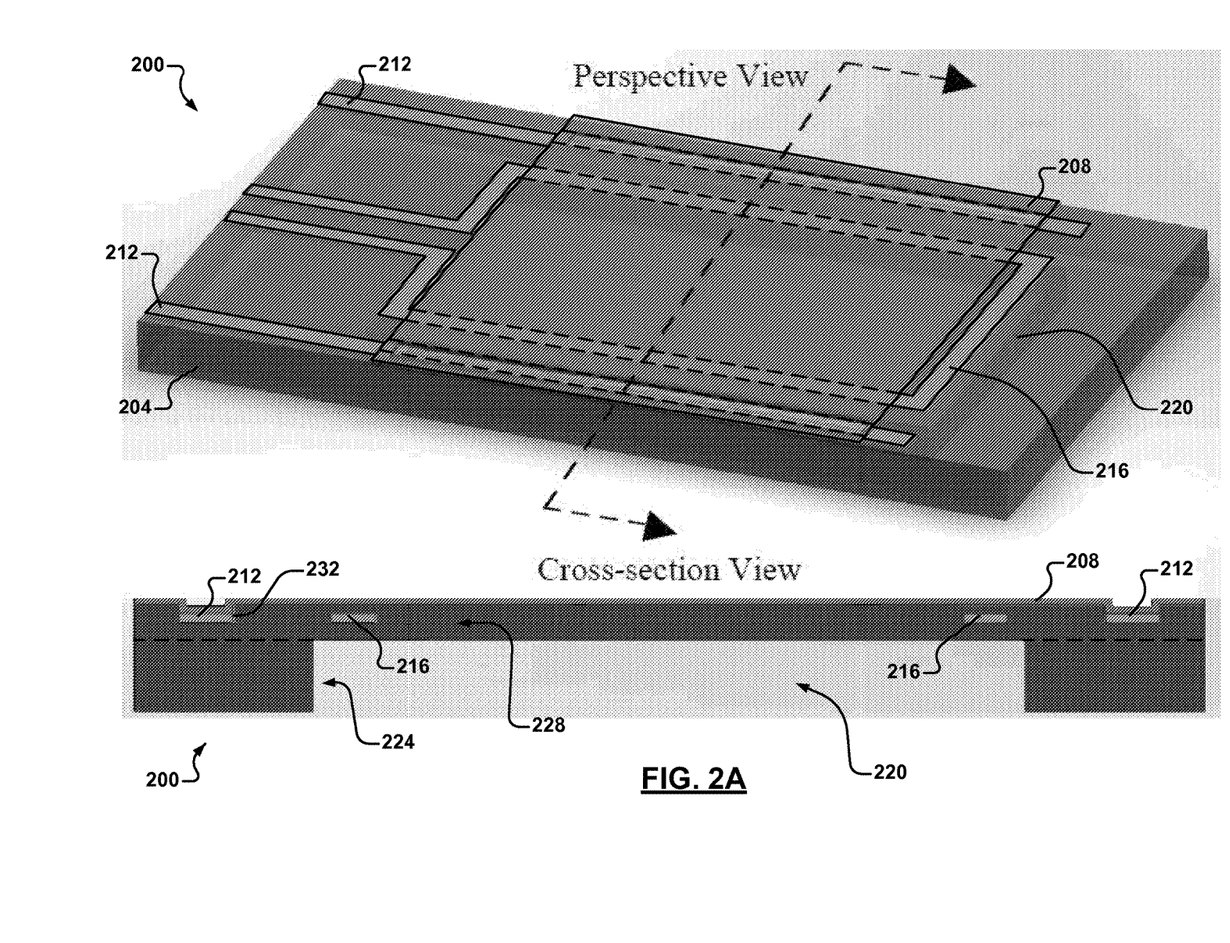
FIG. 2A illustrates a perspective view and a cross-section of an example optical attenuator according to the principles of the present disclosure.
Figure 2B:
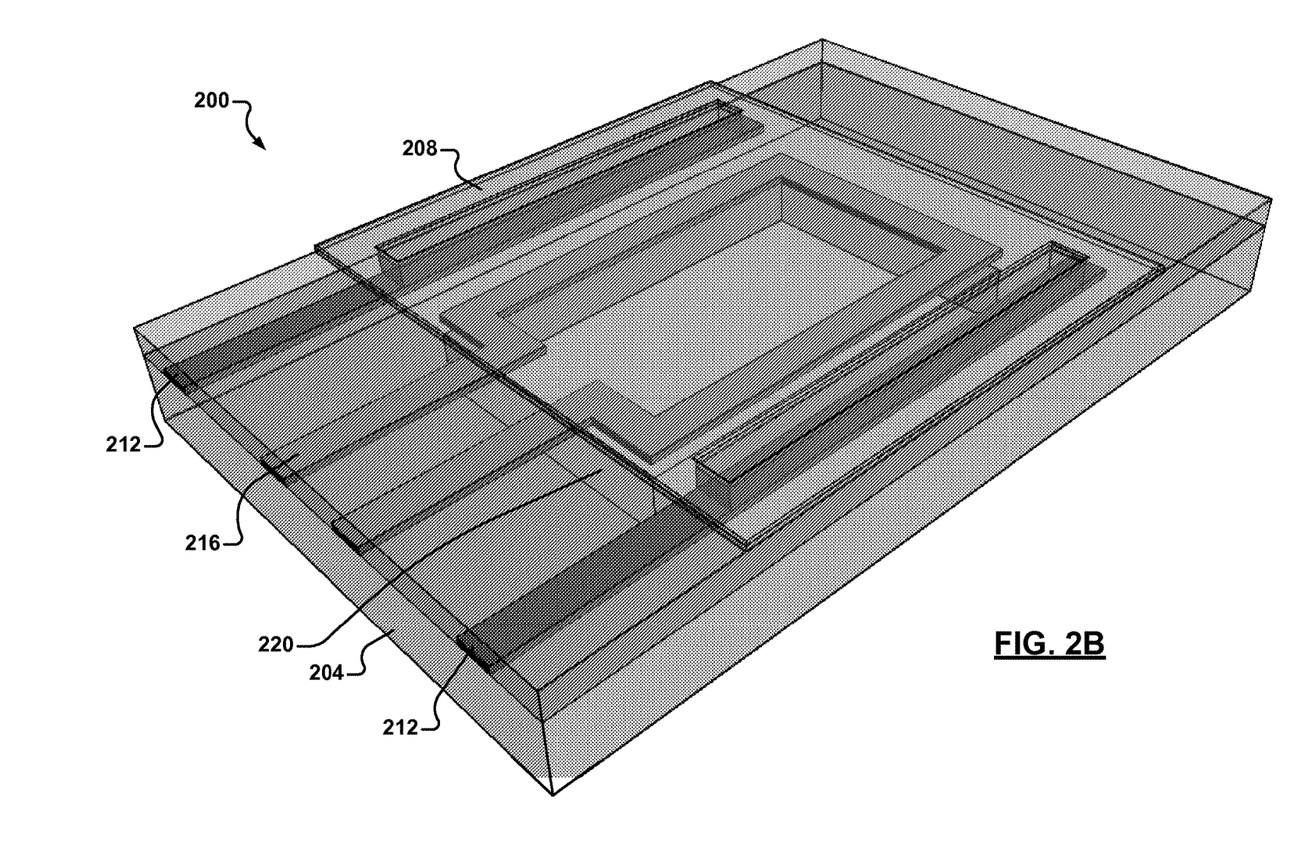
FIG. 2B illustrates another perspective view of an example optical attenuator according to the principles of the present disclosure.
Figure 2C:
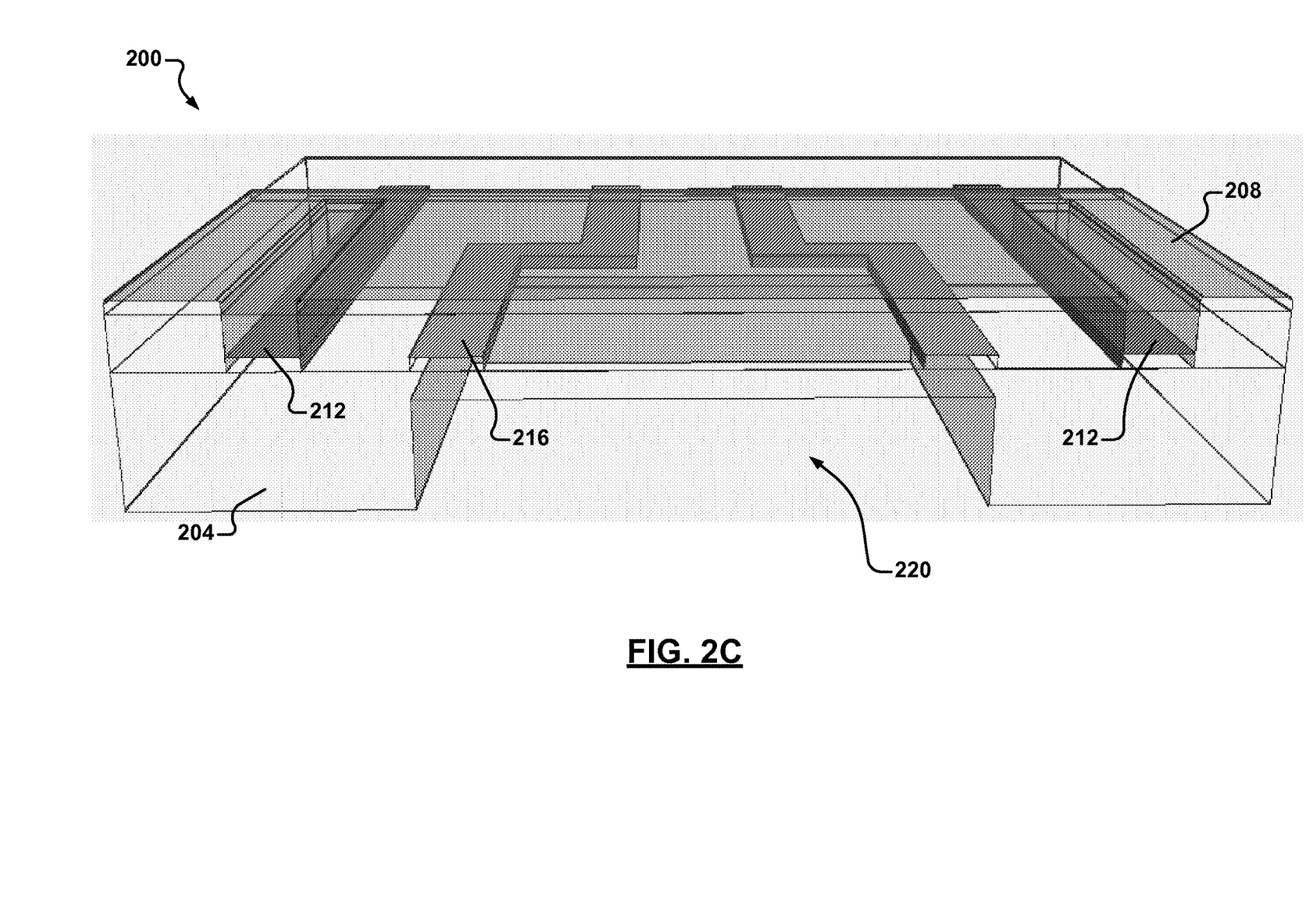
FIG. 2C illustrates a perspective view of a cross-section of an example optical attenuator according to the principles of the present disclosure.

Referring now to FIGS. 2A, 2B, and 2C, a perspective and cross-section view, another perspective view, and a perspective cross-section view, respectively, of an example optical attenuator 200 are shown. The optical attenuator 200 includes a substrate 204 and an attenuation layer 208 formed on the substrate 204. For example only, the substrate 204 is formed of a material having transparency to a desired range of light wavelengths as described above in FIG. 1. The attenuation layer 208 comprises VO2 or another strongly-correlate material as described above in FIG. 1. As shown, the attenuation layer 208 is formed on only a portion of the substrate 204. However, in some implementations, the attenuation layer 208 may be formed on a larger portion of the substrate 204 (e.g., on the entire surface of the substrate 204).

The optical attenuator 200 includes one or more pairs of electrodes 212 and a heating element, such as an electrode loop 216. For example only, the electrodes 212 and the electrode loop 216 comprise platinum, but may be formed using another suitable material. Current is provided through the electrode loop 216 to control a temperature of the attenuation layer 208, resulting in a change in the optical attenuation (i.e., an increase or decrease in the optical transmission percentage) of the attenuation layer 208, resulting in a corresponding change in a resistance of the attenuation layer 208. The resistance of the attenuation layer 208 is measured using the electrodes 212.

Although the electrodes 212 and the electrode loop 216 are shown formed below the attenuation layer 208 and embedded within the substrate 204, respectively, other configurations may be used. For example, the electrodes 212 may be formed above and/or embedded within the attenuation layer 208, and the electrode loop 216 may be formed between the substrate 204 and the attenuation layer 208, embedded within the attenuation layer 208, and/or formed above the attenuation layer 208. Further, although the electrodes 212 are shown located outside of a perimeter formed by the electrode loop 216, the electrodes 212 may also be formed within the perimeter of the electrode loop 216. Conversely, although the electrode loop 216 is shown to have a rectangular shape, other shapes may be used. For example, the electrode loop 216 may be circular or elliptical, and/or may have an accordion shape to increase an area of the attenuation layer 208 heated by the electrode loop 216.

The optical attenuator 200 may include a window, or recessed portion, 220 formed in the substrate 204. The window 220 is formed in a portion of the substrate 204 corresponding to the attenuation layer 208. In other words, a thickness of the substrate 204 in a region under the attenuation layer 208 is less than a thickness of other regions of the substrate 204. Accordingly, the window 220 minimizes the losses of the signal being transmitted due to the absorption of a thicker substrate 204, and reduces the power consumption of the variable optical attenuator 200 required for the heating element 216.

An example fabrication process of the optical attenuator 200 is described with respect to the cross-section view of FIG. 2A. A first layer 224 of the substrate 204 including the window 220 may be formed. A second layer 228 of the substrate 204 is formed on the first layer 224. The second layer 228 may include one or more trenches 232. A platinum layer corresponding to the electrodes 212 and the electrode loop 216 is formed on the second layer 228. For example, the platinum layer is formed in the trenches 232. The attenuation layer 208 is formed on the platinum layer and the second layer 228. In some implementations, an additional layer of the substrate 204 may be formed above the platinum layer of the electrode loop 216 as shown, or the attenuation layer 208 may be formed directly on the platinum layer of the electrode loop 216 (i.e., with no substrate between the electrode loop 216 and the attenuation layer 208).

In other implementations, a first layer of the attenuation layer 208 may be formed on the second layer 228 of the substrate prior to the platinum layer being formed. The platinum layer is formed on the first layer of the attenuation layer 208. A second layer of the attenuation layer 208 is formed on the platinum layer. In this manner, the electrodes 212 and the electrode loop 216 are embedded within the attenuation layer 208. Further, although as shown portions of the attenuation layer 208 corresponding to the trenches 232 are recessed with respect to other portions of the attenuation layer 208, the optical attenuator 200 may be fabricated such that the entire surface of the attenuation layer 208 is coplanar.

Figure 3:
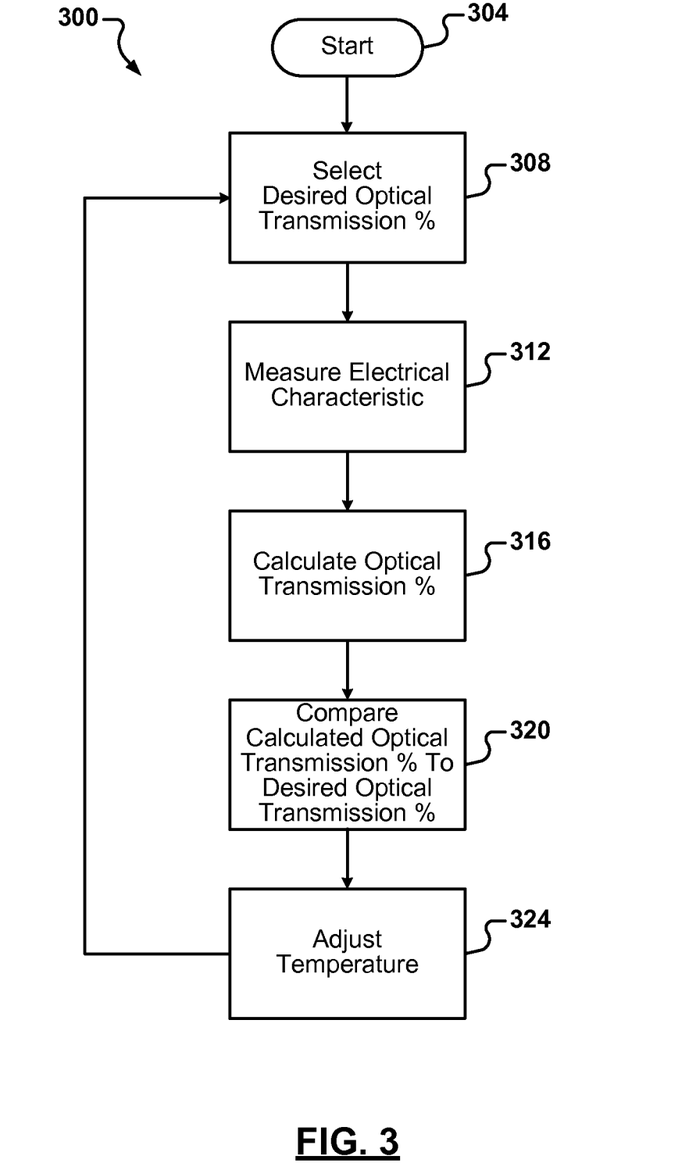
FIG. 3 illustrates an example optical attenuation method according to the principles of the present disclosure.

Referring now to FIG. 3, an example optical attenuation method 300 according to the principles of the present disclosure begins at 304. At 308, the method 300 selects a desired optical transmission percentage of an attenuation layer of an optical attenuator. At 312, the method 300 measures an electrical characteristic (e.g., a resistance) of the attenuation layer. At 316, the method 300 calculates an optical transmission percentage based on the measured electrical characteristic. At 320, the method 300 compares the calculated optical transmission percentage to the desired optical transmission percentage. At 324, the method 300 adjusts, by adjusting a current provided to a heating element, the temperature of the attenuation layer according to a difference between the desired optical transmission percentage and the calculated optical transmission percentage.

Although the optical attenuator as described above includes a heating element that implements a resistive heater, other systems and methods for heating the optical attenuator are anticipated. For example, the optical attenuator may be heated using conductive heating as described in examples below, or any other suitable method.

Although the phase transition in VO2 has been demonstrated to occur at ultrafast time scales, most of the current VO2-based devices are operated by heating the material above the transition temperature. In an example embodiment, the VO2-based VOA described was operated by conductive heating from a Peltier heater. The device consists of a VO2 thin film with coplanar electrodes. The VO2 thin film (200 nm thick) was grown on single crystal quartz (SiO2) substrate (12 mm wide, 11 mm long, and 250 μm thick) by pulsed laser deposition (PLD) at 600° C. A KrF excimer laser was used with a fluence of ~2 J/cm2 at 10 Hz repetition rate on a vanadium target. During VO2 deposition, the backside of the sample was covered by a single crystal silicon wafer piece. This was done to avoid the deposition of material residue on the backside of the substrate, which was observed in previous depositions and experimentally verified to have an impact on the optical transmittance behavior of the sample. Also during deposition, a shadow mask was used on the sample front side with a 5 mm opening, which allowed for the deposition of a VO2 rectangular patch that extended the substrate width of 12 mm. The film was deposited for 30 min under 20 mTorr of oxygen pressure. The deposition was followed with an annealing step of 30 min at the same temperature and pressure conditions used during deposition. After the VO2 deposition, the sample was taken to a custom-built evaporator for the deposition of aluminum, where another shadow mask was used to form the two coplanar electrodes on the VO2 film. The device was then mounted on a Peltier heater with a centered hole (Thorlabs, TEC1.4-6). The inset on FIG. 4 shows the final assembly of the device with the patterned VO2 centered on the heater.

Figure 4:
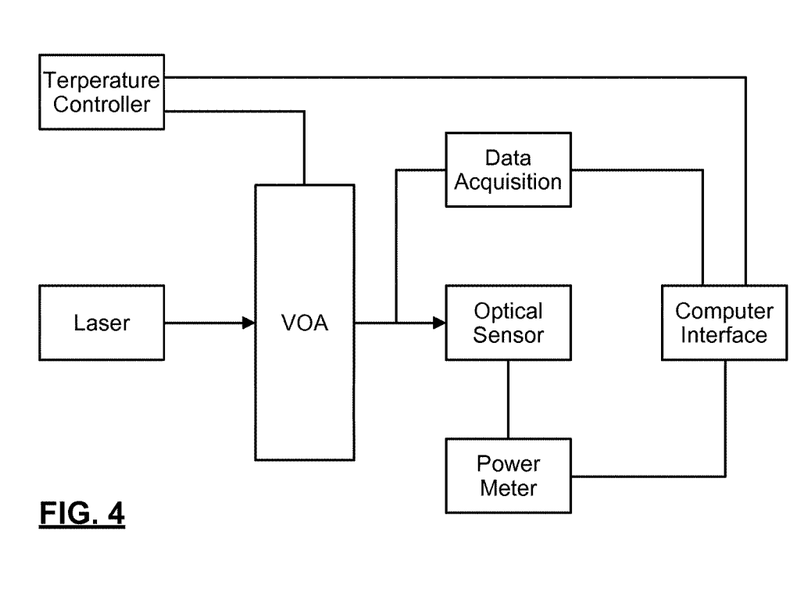
FIG. 4 illustrates an example test setup for performing optical transmission and electrical resistance characterization of an optical attenuator according to the principles of the present disclosure.

The device was mounted in the electro-optical setup shown in FIG. 4. A NIR diode laser with wavelength of 1.55 μm with a spot size of ~5 mm (Thorlabs, FPL1055T), an optical power sensor (Thorlabs, S144C), and a power meter (Thorlabs, PM100D)—all shown in FIG. 4—were used for the optical measurements. Before the experiments, it was necessary to verify that the phase transition of the VO2 film was not induced by the absorption of IR radiation coming from the laser. To this end, the laser power was initially set at its minimum (12 mW). Then, the power was increased to 150 mW and the spot size reduced in order to increase the radiation intensity on the sample, while the film was kept at room temperature and its resistance was being monitored. No noticeable change in resistance was measured in the process, which indicated that the phase change was not being induced photothermally.

For the experiments, a laser power of 12 mW was used. The electrical measurements were recorded using a data acquisition system (National Instruments, cRio), which was constantly measuring the VO2's resistance through connections to the A1 coplanar electrodes. A temperature controller (Thorlabs, TED4015) was employed to control the Peliter heater and trigger the material transition in the VO2. A computer interface (using a virtual instrument in Lab view software) was used to monitor the output of the data acquisition system, the power meter, and to input the temperature (for open-loop experiments) or desired transmittance (for closed-loop experiments), and manipulate the temperature controller.

Figure 5:
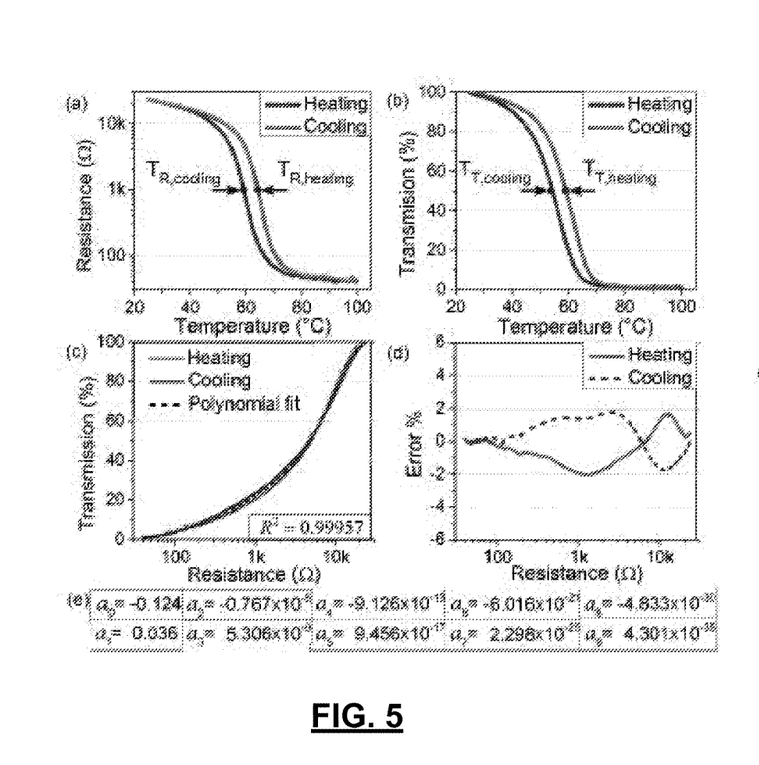
FIG. 5 illustrates example electrical and optical characterizations of VO2, example optical transmission as a function of resistance, and example error between a polynomial model and actual transmission percentage according to the principles of the present disclosure.

The VO2 film was characterized by measuring its electrical resistance and optical transmittance as a function of temperature. Both measurements were done simultaneously, as the temperature was varied. The film's resistance across the phase transition showed a drop of almost three orders of magnitude; which evidences the good quality and orientation of the film (see FIG. 5(a)). Previously characterized films grown under same conditions showed highly orientation in the (011) mono-clinic planes at room temperature and an average grain size of ~50 nm. The drop in the optical transmission across the phase transition was normalized using as reference the transmissivity at room temperature (1.6 mW). After this normalization the transmission drop was from 100% to 2% (see FIG. 5(b)). In terms of decibels, the attenuation increased from OdB to 19.24 dB. This results in a dynamic range of 19.24 dB, which is comparable with the typical range of 25 dB for commercially available VOAs.

It can be noticed that the widths of the resistance and transmittance hysteretic curves are very similar. However, the midpoints of the heating and cooling curves for the resistance and transmission curves (labeled in FIG. 5(a)-(b)) are different. Perhaps the most intuitive explanation for this would be the temperature gradient across the film and the different probing locations for both properties (i.e. electrical resistance and optical transmittance)—the optical transmittance of the VO2 was measured at the center of the film, while the resistance was measured across the film's width through the coplanar electrodes. However, it was verified that the difference in temperature across the sample is only ~1° C., as measured with a thermocouple. Furthermore, the temperature is lower at the center of the sample (like it was measured previously on a similar setup), and this would have resulted in TTs greater than TRs, which is not what was observed.

Typically, the response of VO2-based devices, shows hysteretic behavior between the input (usually temperature) and the output. However, if two strongly correlated properties are used, the relationship between them shows significant reduction of the hysteresis. FIG. 5(c) shows the plot of the two different responses of the VO2 film (optical transmissivity vs. electrical resistance). The largest separation between the heating and cooling curves occurs at the 1 kΩ/20% region, which corresponds to temperatures near the transition. This separation is greatly influenced by the difference in the transition temperature for both properties. This nearly one-to-one correspondence between electrical resistance and optical transmittance allows for the implementation of a self-sensing approach that would eliminate the need for complicated hysteresis compensation or inversion algorithms for controlling the device.

A ninth order polynomial fit was used to model the experimental data as shown in FIG. 5(c) by using the least square method. The error between the model and the measurements of the actual transmission data was calculated in terms of transmission percent. FIG. 5(d) shows a maximum error of +/−2%. The curve fit was used as feedback in the implementation of a simple (yet, effective) closed-loop control configuration. The complete system forms a fully electrically tunable VO2-based VOA for NIR.

Figure 6:
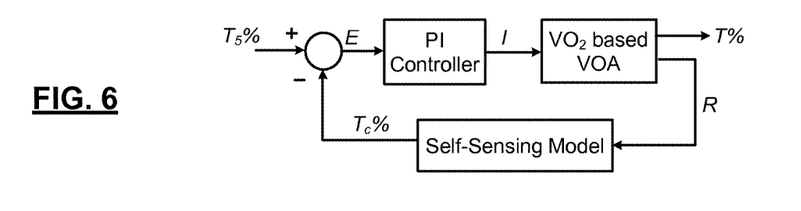
FIG. 6 is an example closed-loop control system for a variable optical attenuator according to the principles of the present disclosure.

A proportional-integral (PI) controller configuration was designed and implemented. The controller gain values were determined from a set of performance specifications and the system dynamics, which are dominated by the thermal dynamics from the heater. Due to the relatively slow system response, which is characterized by an open-loop time constant of 18.5 s, the targeted response time for the closed-loop controlled transmittance is 10 s. The same measurement setup in FIG. 4 is used to perform the VOA closed-loop tests with a configuration represented by the block diagram FIG. 6. The resistance of the VO2 (R) is sensed and used in the model to calculate the correspondent transmission (Tc). This value (Tc) is then compared with the desired transmission (Ts). The error (E) goes to the PI, which controls the current (I) that is sent to the Peltier in order to change the temperature of the sample, therefore controlling the transmission percentage (T).

Figure 7:
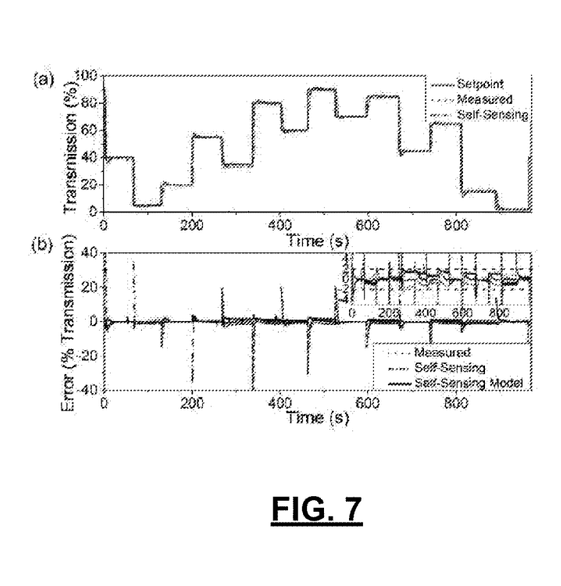
FIG. 7 illustrates an example step response for a variable optical attenuator and example error calculation according to the principles of the present disclosure.

A sequence of input steps (Ts) was used to validate the performance of the presented VOA in terms of transient and steady state error. FIG. 7(a) shows the response of the system to such sequence. The duration of each setpoint was 60 s. An average error of 0.55% was calculated for the measured transmission with respect to the setpoint in steady-state. Also a complete error range of +/−2% is shown in FIG. 7(b), which also shows switching noise. This results show the efficient use of the self-sensing mechanism proposed in terms of transient and steady-state performance. Accurate transmittance values were obtained using the self-sensing method proposed considering the average error value.

Figure 8:
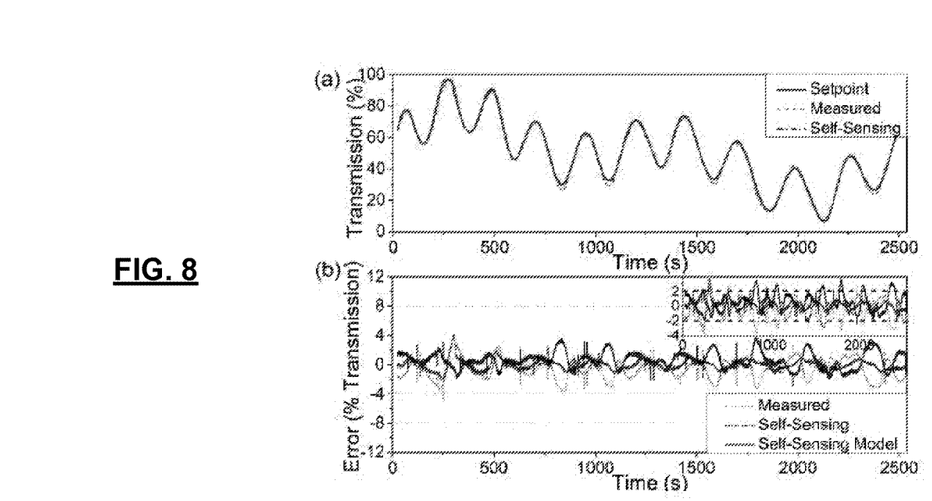
FIG. 8 illustrates an example sinusoidal response for an optical attenuator and an example error according to the principles of the present disclosure.
Figure 9:
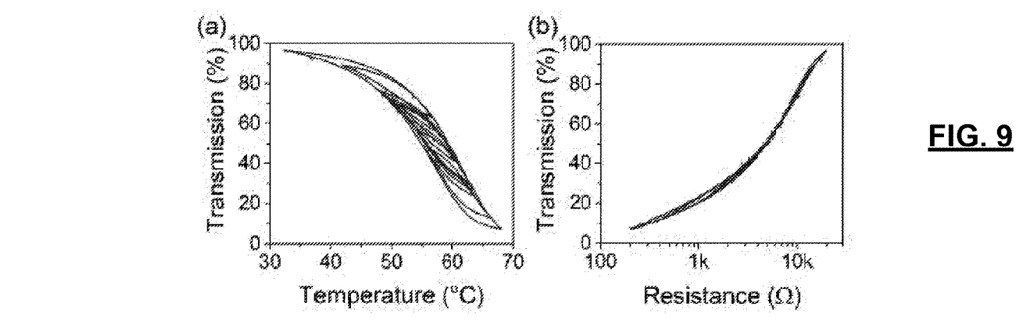
FIG. 9 illustrates an example optical transition as a function of temperature and an example optical transition as a function of resistance according to the principles of the present disclosure.

FIG. 8 shows the response to a sinusoidal input signal comprising of the sum of three sinusoidal waveforms with frequencies of 0.5 mHz, 1 mHz, and 5 mHz; all with an amplitude of T=44%. The model and the measured signal followed the continuously changing setpoint with an average error of 1.15%. The error range for the sinusoidal response (shown in FIG. 8(b)) was similar to that of the step response. This experiment demonstrates how the significantly reduced hysteresis allows for the accurate attenuation control of the VO2-based VOA device, even during the transition region. The measured optical transmission from FIG. 8 is also shown in FIG. 9(a) (b) as a function of temperature and resistance, respectively. It can be noticed that the minor hysteretic curves are significantly reduced in FIG. 9(b) due to the strong properties correlation of the VO2 film.

In summary, this disclosure presents the development of a VOA for NIR wavelengths that is completely electrically tunable, and which fundamental operation is based on the strong correlation of the electrical and optical changes of VO2 across its IMT. The main contribution is the demonstration of a new VOA technology, which relies on the use of self-sensing techniques to control the attenuation of VOAs on a feedback configuration that also results in temperature stability. A highly accurate closed-loop control of the attenuation is achieved using the self-sensing technique shown, with average errors of 0.55% and 1.15% for steps input and continuously changing input, respectively.

The technology demonstrated here uses vanadium dioxide (VO2) thin films as the active element in the VOA. Nevertheless, the use of different correlated materials that show abrupt changes in their optical and electrical properties are also included in the present invention. Different correlated materials show transitions during which their optical and electrical properties change drastically, and therefore may become appropriate for the present disclosure. An example metal oxide that can replace the VO2 thin film used here is another stable vanadium oxide: vanadium sesquioxide (V2O3). V2O3 shows a resistivity and reflectivity drop several orders of magnitude and 50%, respectively, when cooled below the transition temperature.

It should be noted that not all correlated materials show the drop in optical properties in the same range of wavelengths as the VO2 film described in the present disclosure. Therefore, different correlated materials will be found useful for VOA that are used in systems that involve optical signals of wavelengths within the range of the large change in optical properties of the correlated material.

Also, different strongly-correlated materials have different transition temperatures. Therefore, the operating temperature range for VOAs made from different correlated materials will be different. If the transition temperature of a correlated material used in the VOA is above room temperature, this could be achieved by simply increasing the current signal across the resistive heater in the present device. If the transition temperature is below room temperature, the present device would have to be modified to replace the resistive heater with a cooling system.

Moreover, the transitions of different correlated materials could be induced by means other than temperature. For example, if the IMT of a particular material can be induced by an external electric field, the principles of the present disclosure could be adapted by modifying the device design to provide an external electric field (instead of the resistive heater discussed) to the VO2 window described. Another possible way to induce the phase change is by current injection.

In addition to its use in variable optical attenuator devices, the principles of the present disclosure can be used in tunable anti-reflecting coatings. Anti-reflecting coatings are used to minimize the reflectance of incident light, thus increasing the intensity of the incident light on a substrate. The substrate could be composed of multi-layered films with different indices of refraction. The total reflectance is then dependent on: 1) the index of refraction of the different films that form the substrate, 2) the thickness of each film, and 3) the wavelength of the incident light.

Typical anti-reflection coatings are deposited from a specific material with a unique index of refraction, and, after deposition, they have a specific thickness. Therefore, they operate optimally for a single wavelength of incident light. The principles of the present disclosure can be used to tune the index of refraction of the strong correlated material used as anti-reflection coating by using the film's resistance as sensing feedback. Tuning the index of refraction will allow for the anti-reflection coating to operate optimally in a range of wavelengths (not a single wavelength). Such tunable anti-reflection coating could decrease the reflectance losses in optical lenses or windows, or increase the efficiency of other optical-devices, such as solar cells.

Alternative materials could be used as heating element and for the electrical connection (electrodes). Such materials should exhibit optical transparency to the selected operating wavelengths of the VOA (infrared region, for the case presented in this invention). These alternative materials could include doped semiconductors, ceramics, alloys and thin metals.

Implementing an infrared transparent material with the principles of the present disclosure will decrease losses due to reflection, and make the device more efficient. Many possibilities for designing the geometry of this heating element could emerge by having a suitable transparent material. The designs could be optimized to: 1) have better temperature uniformity, 2) increment the heating area on the strongly correlated material (which could decrease the response time of the device), and 3) eliminate limitations to spot size of the laser beam being attenuated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An optical attenuator comprising:
a substrate, wherein the substrate is transparent with respect to a range of light wavelengths;
an attenuation layer formed on the substrate, the attenuation layer comprising a strongly-correlated material, wherein an optical transmissivity of the strongly-correlated material is strongly correlated with a resistance of the strongly-correlated material, and wherein the optical transmissivity as applied to the light wavelengths is variable; and
a pair of electrodes at least one of formed on and embedded within the attenuation layer, the pair of electrodes configured to provide an indication of the resistance of the attenuation layer; and
an optical attenuation control module that measures the resistance of the attenuation layer, determines the optical transmissivity of the attenuation layer based on the resistance of the attenuation layer, and adjusts the optical transmissivity of the attenuation layer within a range of values, where the optical transmissivity can be adjusted to one of three or more values in the range of values.

2. The optical attenuator of claim 1, wherein the resistance of the attenuation layer is indicative of the optical transmissivity of the attenuation layer.

3. The optical attenuator of claim 1, wherein the strongly-correlated material corresponds to vanadium dioxide.

4. The optical attenuator of claim 1, further comprising a heating element at least one of formed on and embedded within the attenuation layer, wherein the heating element adjusts a temperature of the attenuation layer.

5. The optical attenuator of claim 4, wherein the heating element receives a current and adjusts the temperature of the attenuation layer based on the current.

6. The optical attenuator of claim 1, wherein the substrate includes a window, and wherein the attenuation layer is formed on a region of the substrate corresponding to the window.

7. The optical attenuator of claim 6, wherein a thickness of the region of the substrate corresponding to the window is less than a thickness of other regions of the substrate.

8. The optical attenuation system of claim 1 wherein the optical attenuation control module adjusts, based on the resistance, a temperature of the attenuation layer to adjust the optical transmissivity of the attenuation layer.

9. The optical attenuation system of claim 8, wherein the optical attenuation control module provides a current to an heating element to adjust the temperature of the attenuation layer, wherein the heating element is at least one of formed on and embedded within the attenuation layer.

10. The optical attenuation system of claim 8, wherein the optical attenuation control module implements a proportional-integral controller to adjust the temperature of the attenuation layer based on the resistance of the attenuation layer.

11. An optical attenuation system, comprising:
an optical attenuator, the optical attenuator comprising a strongly-correlated material, wherein an optical transmissivity of the strongly-correlated material is strongly correlated with a resistance of the strongly-correlated material, and wherein the optical transmissivity is variable; and
an optical attenuation control module that measures the resistance of the optical attenuator and determines the optical transmissivity of the optical attenuator based on the resistance of the optical attenuator and adjusts the optical transmissivity of the attenuation layer amongst a plurality of values in a range of 25 dB.

12. The optical attenuation system of claim 11 wherein the optical attenuation control module adjusts, based on the resistance, a temperature of the optical attenuator to adjust the optical transmissivity of the optical attenuator.

13. The optical attenuation system of claim 12, wherein the optical attenuation control module provides a current to a heating element to adjust the temperature of the optical attenuator, wherein the heating element is at least one of formed on and embedded within the optical attenuator.

14. The optical attenuation system of claim 12, wherein the optical attenuation control module implements a proportional-integral controller to adjust the temperature of the optical attenuator based on the resistance of the optical attenuator.

15. The optical attenuation system of claim 11, wherein the strongly-correlated material corresponds to vanadium dioxide.

16. The optical attenuation system of claim 11, wherein the optical attenuator comprises:
   a substrate, wherein the substrate is transparent with respect to a range of light wavelengths;
   an attenuation layer formed on the substrate, the attenuation layer comprising the strongly-correlated material; and
   a pair of electrodes at least one of formed on and embedded within the attenuation layer, the pair of electrodes configured to provide an indication of the resistance of the optical attenuator.

17. The optical attenuation system of claim 16, further comprising a heating element at least one of formed on and embedded within the attenuation layer, wherein the heating element adjusts a temperature of the attenuation layer.

18. The optical attenuation system of claim 17, wherein the heating element receives a current from the optical attenuation control module and adjusts the temperature of the attenuation layer based on the current.

19. The optical attenuation system of claim 16, wherein the substrate includes a window, and wherein the attenuation layer is formed on a region of the substrate corresponding to the window.

20. An optical attenuator comprising:
   a substrate, wherein the substrate is transparent with respect to a range of light wavelengths;
   an attenuation layer formed on the substrate, the attenuation layer comprising a strongly-correlated material, wherein an optical transmissivity of the strongly-correlated material is strongly correlated with a resistance of the strongly-correlated material, and wherein the optical transmissivity as applied to the light wavelengths is variable; and
   a pair of electrodes at least one of formed on and embedded within the attenuation layer, the pair of electrodes configured to provide an indication of the resistance of the attenuation layer; and
   an optical attenuation control module configured to measure the resistance of the attenuation layer, wherein the optical attenuation control module operates to determine the optical transmissivity of the attenuation layer based on the resistance of the attenuation layer and varies the optical transmissivity of the attenuation layer amongst multiple values from 0 dB to 20 dB in accordance with the determination.

* * * * *

UNITED STATES PATENT AND TRADEMARK OFFICE
CERTIFICATE OF CORRECTION

PATENT NO. : 10,216,015 B2  
APPLICATION NO. : 15/123151  
DATED : February 26, 2019  
INVENTOR(S) : Nelson Sepulveda-Alancastro et al.

Page 1 of 1

It is certified that error appears in the above-identified patent and that said Letters Patent is hereby corrected as shown below:

On the Title Page

Item (71) Column 1, Line 2, "East Landing" should be --East Lansing--.

In the Drawings

Sheet 6 of 8, Fig. 4, "Terperature" should be --Temperature--.

In the Specification

Column 8, Line 24, "OdB" should be --0 dB--.

Signed and Sealed this  
Twenty-fourth Day of September, 2019

Andrei Iancu  
*Director of the United States Patent and Trademark Office*